(12) United States Patent
Li et al.

(10) Patent No.: US 10,156,756 B2
(45) Date of Patent: Dec. 18, 2018

(54) LIQUID CRYSTAL PANEL AND PIXEL STRUCTURE THEREOF

(71) Applicant: WUHAN CHINA STAR OPTOELECTRONICS TECHNOLOGY CO., LTD, Wuhan (CN)

(72) Inventors: Yafeng Li, Wuhan (CN); Xiangyi Peng, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 185 days.

(21) Appl. No.: 14/907,865

(22) PCT Filed: Jan. 12, 2016

(86) PCT No.: PCT/CN2016/070627
§ 371 (c)(1),
(2) Date: Jan. 27, 2016

(87) PCT Pub. No.: WO2017/101185
PCT Pub. Date: Jun. 22, 2017

(65) Prior Publication Data
US 2017/0255065 A1    Sep. 7, 2017

(30) Foreign Application Priority Data

Dec. 18, 2015    (CN) .......................... 2015 1 0964545

(51) Int. Cl.
*G02F 1/1343*    (2006.01)

(52) U.S. Cl.
CPC .... *G02F 1/134309* (2013.01); *G02F 1/13439* (2013.01); *G02F 1/134363* (2013.01);
(Continued)

(58) Field of Classification Search
None
See application file for complete search history.

(56) References Cited

U.S. PATENT DOCUMENTS 6,094,250 A * 7/2000 Choi ................. G02F 1/134363
349/141
6,160,600 A * 12/2000 Yamazaki ......... G02F 1/134363
349/123
(Continued)

FOREIGN PATENT DOCUMENTS

CN    102445796 A    5/2012
CN    103257495 A    8/2013
(Continued)

*Primary Examiner* — Edward Glick
*Assistant Examiner* — David Chung
(74) *Attorney, Agent, or Firm* — Muncy, Geissler, Olds & Lowe, P.C.

(57) ABSTRACT

A liquid crystal panel and a pixel structure thereof are described. The pixel structure has a common electrode, a protecting layer, a plurality of pixel electrodes, and a plurality of first channels. The protecting layer is located on the common electrode; the pixel electrodes are located on the protecting layer; and the first channels are located between the neighboring pixel electrodes and pass through the protecting layer, so that the first channels expose a top surface of the common electrode.

6 Claims, 2 Drawing Sheets

(52) U.S. Cl.
CPC ............ *G02F 2001/134372* (2013.01); *G02F 2201/121* (2013.01); *G02F 2201/123* (2013.01); *G02F 2201/50* (2013.01)

(56) References Cited

U.S. PATENT DOCUMENTS

| | | |
|---|---|---|
| 2007/0182899 A1 | 8/2007 | Tanaka |
| 2013/0021385 A1 | 1/2013 | Hou |
| 2014/0347261 A1 | 11/2014 | Xue et al. |
| 2016/0246121 A1 | 8/2016 | Hao et al. |
| 2016/0266454 A1 | 9/2016 | Wang |

FOREIGN PATENT DOCUMENTS

| | | |
|---|---|---|
| CN | 103488004 A | 1/2014 |
| CN | 104122701 A | 10/2014 |
| CN | 104155814 A | 11/2014 |

\* cited by examiner

LIQUID CRYSTAL PANEL AND PIXEL STRUCTURE THEREOF

FIELD OF THE INVENTION

The present invention relates to a liquid crystal display technique field, and more particularly to a liquid crystal panel and a pixel structure thereof.

BACKGROUND OF THE INVENTION

A liquid crystal transmittance is an ability with which that a backlight can penetrate a liquid crystal layer and has an important relationship with a liquid crystal electric field distribution and an electric field density. The liquid crystal electric field distribution and the electric field density are decided by pixel electrodes in a pixel structure together with an applied electric field. Therefore, the design of the pixel electrodes has a very important meaning.

As for a pixel, the pixel electrode would be connected with a source/drain by a channel penetrating through a protective layer, thus the channel hole is required to be fabricated during the process. In a conventional pixel structure, the channel hole is only one in number, and a common electrode is in an entire surface type. The electric field is produced by two electrodes (a common electrode and a pixel electrode), and the pixel electrode needs to penetrate through the protective layer for forming a voltage difference with the common electrode. When the electric field penetrates through the protective layer, the strength of the electric field would be reduced, therefore a distribution face of electric field lines is small, and the electric field density is low.

As a result, it is necessary to provide a liquid crystal panel and a pixel structure thereof to solve the problems existing in the conventional technologies.

SUMMARY OF THE INVENTION

In view of this, the present invention provides a liquid crystal panel and a pixel structure thereof, which can solve the problems existing in the conventional technologies, where a distribution face of electric field lines is small and the electric field density is low.

To achieve the above object of the present invention, an embodiment of the present invention provides a pixel structure, wherein the pixel structure comprises: a common electrode, a protecting layer, a plurality of pixel electrodes, and a plurality of first channels. The protecting layer is located on the common electrode. The pixel electrodes are located on the protecting layer. The first channels are located between the neighboring pixel electrodes and pass through the protecting layer, wherein the first channels expose a top surface of the common electrode; wherein the pixel structure further comprises a plurality of second channels, each of the second channels are correspondingly formed at an end of each of the pixel electrodes respectively, and the second channels expose the top surface of the common electrode; and wherein each of the pixel electrodes is parallel to each other in an extending direction and extended to form on the common electrode.

In one embodiment of the present invention, the second channels are vias so as to electrically connect each of the pixel electrodes with the common electrode.

In one embodiment of the present invention, the common electrode and the pixel electrodes are formed from indium tin oxide.

A further embodiment of the present invention provides a pixel structure, wherein the pixel structure comprises: a common electrode, a protecting layer, a plurality of pixel electrodes and a plurality of first channels. The protecting layer is located on the common electrode. The pixel electrodes are located on the protecting layer. The first channels are located between the neighboring pixel electrodes and pass through the protecting layer, wherein the first channels expose a top surface of the common electrode.

In one embodiment of the present invention, the pixel structure further comprises: a plurality of second channels, wherein each of the second channels are correspondingly formed at an end of each of the pixel electrodes respectively, and the second channels expose the top surface of the common electrode.

In one embodiment of the present invention, the second channels are vias so as to electrically connect each of the pixel electrodes with the common electrode.

In one embodiment of the present invention, each of the pixel electrodes is parallel to each other in an extending direction and extended to form on the common electrode.

In one embodiment of the present invention, the common electrode and the pixel electrodes are formed from indium tin oxide.

Furthermore, another embodiment of the present invention provides a liquid crystal panel structure, wherein the liquid crystal panel structure comprises a pixel structure and the pixel structure comprises: a common electrode, a protecting layer, a plurality of pixel electrodes, and a plurality of first channels. The protecting layer is located on the common electrode. The pixel electrodes are located on the protecting layer. The first channels are located between the neighboring pixel electrodes and pass through the protecting layer, wherein the first channels expose a top surface of the common electrode; wherein the pixel structure further comprises a plurality of second channels, each of the second channels are correspondingly formed at an end of each of the pixel electrodes respectively, and the second channels expose the top surface of the common electrode; and wherein each of the pixel electrodes is parallel to each other in an extending direction and extended to form on the common electrode.

In one embodiment of the present invention, the liquid crystal panel structure further comprising: an array substrate, wherein the array substrate has the pixel structure thereon.

In one embodiment of the present invention, the pixel structure further comprises: a plurality of second channels, wherein each of the second channels are correspondingly formed at an end of each of the pixel electrodes respectively, and the second channels expose the top surface of the common electrode.

In one embodiment of the present invention, the second channels are vias so as to electrically connect each of the pixel electrodes with the common electrode.

In one embodiment of the present invention, each of the pixel electrodes is parallel to each other in an extending direction and extended to form on the common electrode.

In one embodiment of the present invention, the common electrode and the pixel electrodes are formed from indium tin oxide.

To make the above description of the present invention more clearly comprehensible, it is described in detail below in examples of preferred embodiments with the accompanying drawings.

DETAILED DESCRIPTION OF THE PREFERRED EMBODIMENTS

The following description of the embodiments with reference to the appended drawings is used for illustrating specific embodiments which may be used for carrying out the present invention. Furthermore, the directional terms described by the present invention, such as upper, lower, top, bottom, front, back, left, right, inner, outer, side, around, center, horizontal, lateral, vertical, longitudinal, axial, radial, uppermost or lowermost, etc., are only directions by referring to the accompanying drawings. Thus, the used directional terms are used to describe and understand the present invention, but the present invention is not limited thereto.

Figure 1:
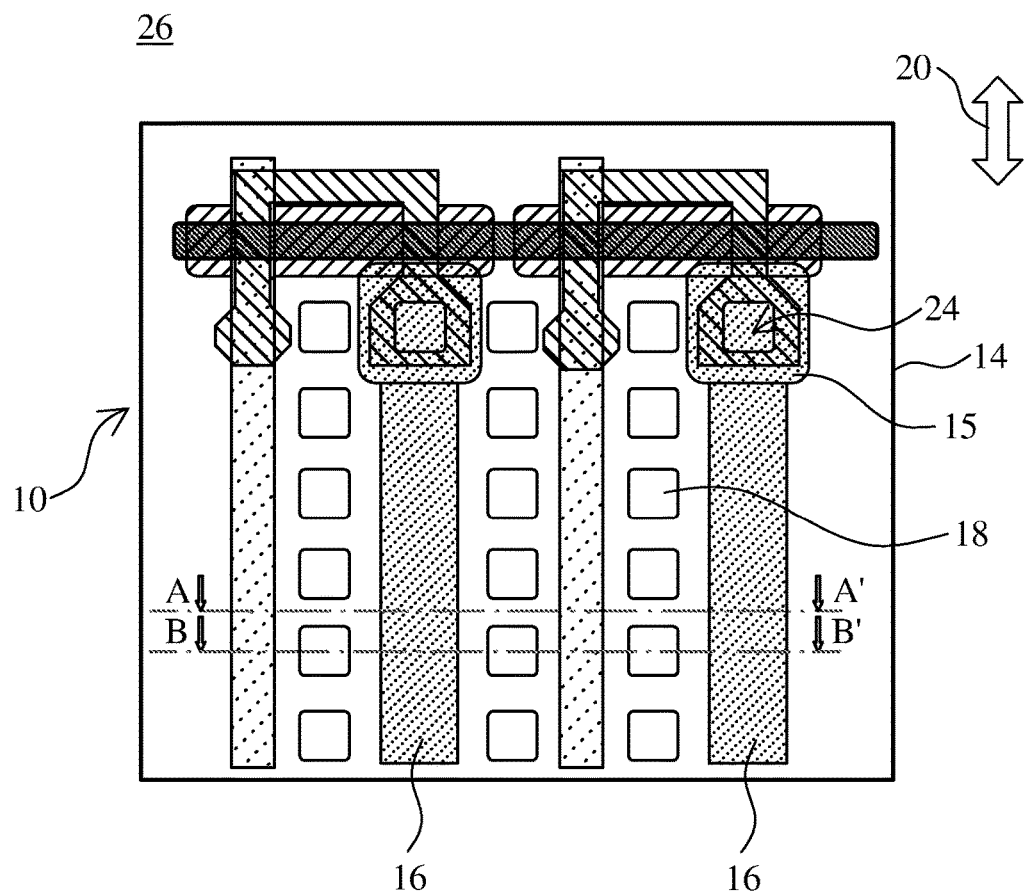
FIG. 1 is a top view schematic diagram showing a pixel structure of a liquid crystal panel structure of an embodiment of the present invention.
Figure 2A:
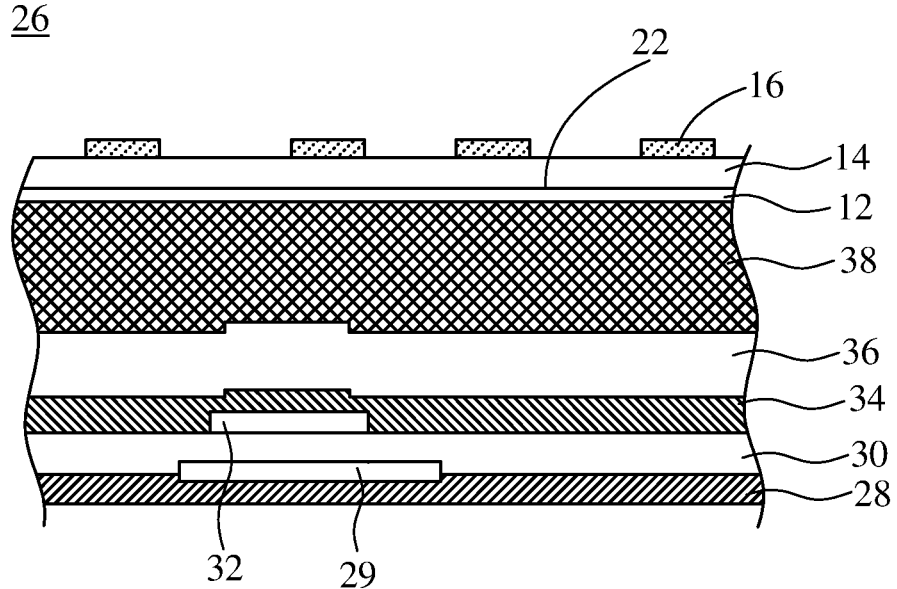
FIG. 2A is a cross-sectional schematic diagram along a line A-A' in FIG. 1.
Figure 2B:
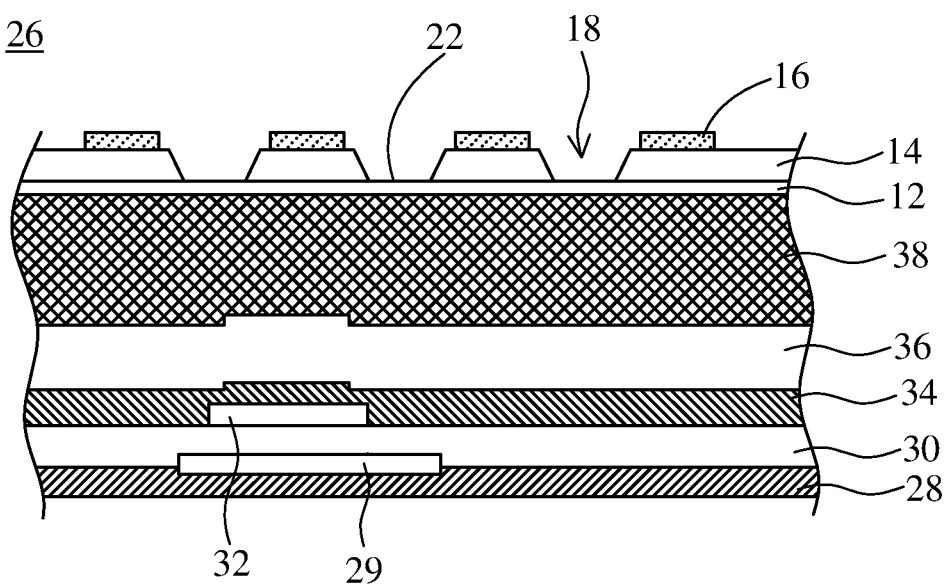
FIG. 2B is a cross-sectional schematic diagram along a line B-B' in FIG. 1.

Please refer to FIGS. 1 to 2B. FIG. 1 is a top view schematic diagram showing a pixel structure 10 of a liquid crystal panel structure 26 of an embodiment of the present invention; FIG. 2A is a cross-sectional schematic diagram along a line A-A' in FIG. 1; and FIG. 2B is a cross-sectional schematic diagram along a line B-B' in FIG. 1. The pixel structure 10 of an embodiment of the present invention mainly comprises a common electrode 12, a protecting layer 14, a plurality of pixel electrodes 16, and a plurality of first channels 18. The common electrode 12 can be formed from indium tin oxide. The protecting layer 14 is located on the common electrode 12. In one embodiment, the protecting layer 14 is a passivation layer, which is formed from materials such as SiNx and SiOx. The protecting layer 14 is used to protect and separate the common electrode 12 from the pixel electrodes 16. The pixel electrodes 16 are located on the protecting layer 14, wherein the pixel electrodes 16 can be formed from indium tin oxide. In one embodiment, each of the pixel electrodes 16 is parallel to each other in an extending direction 20 and extended to form on the common electrode 12. For example, the extending direction 20 in FIG. 1 is a vertical direction, and a slit is formed between the neighboring pixel electrodes 16 for performing an alignment on liquid crystals. The first channels 18 are located between the neighboring pixel electrodes 16 and pass through the protecting layer, 14 wherein the first channels 16 expose a top surface 22 of the common electrode. The first channels 18 are mainly used to avoid the problems of a small distribution face of electric field lines and a low electric field density. In one embodiment, the first channels 18 can be arranged and disposed along the extending direction 20. In detail, a voltage difference would be produced between the common electrode 12 and the pixel electrodes 16, but the protecting layer 14 between the common electrode 12 and the pixel electrodes 16 would reduce the voltage difference, since the existing of the protecting layer 14 inevitably reduces the voltage difference. Therefore, the first channels 18 are used to expose the top surface 22 of the common electrode 12 for reducing the amount of the decline in the voltage difference by reducing the proportion of the protecting layer 14, thereby causing a large distribution face of electric field lines and a high electric field density.

In one embodiment, the pixel structure 10 of an embodiment of the present invention further comprises a plurality of second channels 24, wherein each of the second channels 24 are correspondingly formed at an end 25 of each of the pixel electrodes 16 respectively, and the second channels 24 expose the top surface 22 of the common electrode 12. The second channels 24 are vias so as to electrically connect each of the pixel electrodes 16 with the common electrode 12.

In a liquid crystal panel structure 26 of another embodiment of the present invention, the liquid crystal panel structure 26 may further comprise the pixel structure 10. The liquid crystal panel structure 26 may comprise an array substrate 28, wherein the array substrate 28 has the pixel structure 10 thereon. In one embodiment, the liquid crystal panel structure 26 may further comprise a light shielding layer 29, a first insulating layer 30, a polycrystalline layer 32, a second insulating layer 34, a third insulating layer 36, and a flat protecting layer 38. For example, the light shielding layer 28 can be a black matrix; the first insulating layer 30, the second insulating layer 34, and the third insulating layer 36 are formed from materials including SiNx and SiOx. The pixel structure 10 is disposed on the flat protecting layer 38, wherein the common electrode 12 is in an entire face type to form on the flat protecting layer 38. The flat protecting layer 38 is formed from materials such as organics. From FIGS. 4A and 4B, the first channels 18 are mainly formed inside the protecting layer 14. Further, the first channels 18 are not located at the positions of the pixel electrodes 16 but between the neighboring pixel electrodes 16. Therefore, the first channels 18 are used to expose the top surface 22 of the common electrode 12 for reducing the amount of the decline in the voltage difference by reducing the proportion of the protecting layer 14, thereby causing a large distribution face of electric field lines and a high electric field density.

As described above, the present invention provides a liquid crystal panel and a pixel structure thereof for solving the problems existing in the conventional technologies, in which a distribution face of electric field lines is small and an electric field density is low, by forming a plurality of first channels in the protecting layer of the pixel structure.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A liquid crystal panel structure, comprising:
   a light shielding layer, a first insulating layer, a polycrystalline layer, a second insulating layer, a third insulating layer, and a flat protecting layer, wherein the light shielding layer, the first insulating layer, the polycrystalline layer, the second insulating layer, and the third insulating layer are all disposed on a bottom side of the flat protecting layer;
   a pixel structure disposed on a top side of the flat protecting layer, the pixel structure comprising:
      a common electrode having a same shape and size as the flat protecting layer and having a bottom surface disposed on the top side of the flat protecting layer;
      a protecting layer located on the common electrode;
      a plurality of pixel electrodes located on the protecting layer; and
      a plurality of first channels located between the neighboring pixel electrodes and passing through the protecting layer, wherein the first channels expose a top surface of the common electrode.

2. The liquid crystal panel structure according to claim 1, further comprising an array substrate, wherein the array substrate has the pixel structure thereon.

3. The liquid crystal panel structure according to claim 1, further comprising a plurality of second channels, wherein each of the second channels are correspondingly formed at an end of each of the pixel electrodes respectively, and the second channels expose the top surface of the common electrode.

4. The liquid crystal panel structure according to claim 3, wherein the second channels are vias so as to electrically connect each of the pixel electrodes with the common electrode.

5. The liquid crystal panel structure according to claim 1, wherein each of the pixel electrodes is parallel to each other in an extending direction and extended to form on the common electrode.

6. The liquid crystal panel structure according to claim 1, wherein the common electrode and the pixel electrodes are formed from indium tin oxide.

\* \* \* \* \*